United States Patent
Chen et al.

(10) Patent No.: US 8,782,324 B1
(45) Date of Patent: Jul. 15, 2014

(54) TECHNIQUES FOR MANAGING PLACEMENT OF EXTENTS BASED ON A HISTORY OF ACTIVE EXTENTS

(75) Inventors: Xiangping Chen, Shrewsbury, MA (US); Philippe Armangau, Acton, MA (US)

(73) Assignee: EMC Corporation, Hopkinton, MA (US)

( * ) Notice: Subject to any disclaimer, the term of this patent is extended or adjusted under 35 U.S.C. 154(b) by 132 days.

(21) Appl. No.: 13/536,371

(22) Filed: Jun. 28, 2012

(51) Int. Cl.
  *G06F 12/02* (2006.01)
  *G06F 12/08* (2006.01)

(52) U.S. Cl.
  USPC .......................................... 711/102; 711/103

(58) Field of Classification Search
  USPC ................................. 711/102, 103
  See application file for complete search history.

(56) References Cited

U.S. PATENT DOCUMENTS

| | | | |
|---|---|---|---|
| 7,631,155 B1 | 12/2009 | Bono et al. | |
| 7,694,191 B1 | 4/2010 | Bono et al. | |
| 7,752,312 B1 | 7/2010 | Perrin et al. | |
| 7,818,535 B1 | 10/2010 | Bono et al. | |
| 8,046,366 B1 | 10/2011 | Perrin et al. | |
| 8,285,758 B1 | 10/2012 | Bono et al. | |
| 8,380,928 B1 | 2/2013 | Chen et al. | |
| 8,381,213 B1 | 2/2013 | Naamad et al. | |
| 8,392,370 B1 | 3/2013 | Whitney et al. | |
| 8,407,265 B1 | 3/2013 | Scheer et al. | |
| 8,429,346 B1 | 4/2013 | Chen et al. | |
| 8,543,615 B1 | 9/2013 | Nair et al. | |
| 8,566,371 B1 | 10/2013 | Bono et al. | |
| 8,566,483 B1 | 10/2013 | Chen et al. | |
| 2008/0077682 A1 | 3/2008 | Nair et al. | |

*Primary Examiner* — Yong Choe
(74) *Attorney, Agent, or Firm* — BainwoodHuang (57) ABSTRACT

A technique of managing data placement involves constructing an active extent list which identifies active extents stored in a storage pool based on a history of extent activity. The technique further involves based on the active extent list, generating preferred extent-tier pairings for extents of a particular LUN slice that are initially stored on a first tier of the pool, the preferred extent-tier pairings matching (i) a first extent of that LUN slice to the first tier and (ii) a second extent of that LUN slice to a second tier of the pool. The technique further involves, based on the preferred extent-tier pairings, maintaining the first extent on the first tier and relocating the second extent from the first tier to the second tier to distribute the first and second extents of that LUN slice across multiple tiers of the pool in accordance with the extent activity history.

20 Claims, 10 Drawing Sheets

```
                              200
                              ↙

┌─────────────────────────────────────────────────┐
│ CONSTRUCT AN ACTIVE EXTENT LIST WHICH IDENTIFIES ACTIVE │
│ EXTENTS STORED IN A POOL OF NON-VOLATILE STORAGE │
│ BASED ON A HISTORY OF EXTENT ACTIVITY            │
└─────────────────────────────────────────────────┘  ~ 202
                    │
                    ▼
┌─────────────────────────────────────────────────┐
│ BASED ON THE ACTIVE EXTENT LIST, GENERATE A SET OF │
│ PREFERRED EXTENT-TIER PAIRINGS FOR EXTENTS OF A  │
│ PARTICULAR LUN SLICE THAT AREA INITIALLY STORED ON A │
│ FIRST TIER OF THE POOL, THE SET OF PREFERRED     │
│ EXTENT-TIER PAIRINGS MATCHING (I) A FIRST EXTENT OF THE │
│ PARTICULAR LUN SLICE TO THE FIRST TIER OF THE POOL AND │
│ (II) A SECOND EXTENT OF THE PARTICULAR LUN SLICE TO A │
│ SECOND TIER OF THE POOL                          │
└─────────────────────────────────────────────────┘  ~ 202
                    │
                    ▼
┌─────────────────────────────────────────────────┐
│ BASED ON THE SET OF PREFERRED EXTENT-TIER PAIRINGS, │
│ MAINTAIN STORAGE OF THE FIRST EXTENT OF THE PARTICULAR │
│ LUN SLICE ON THE FIRST TIER OF THE POOL AND RELOCATE │
│ STORAGE OF THE SECOND EXTENT OF THE PARTICULAR LUN │
│ SLICE FROM THE FIRST TIER OF THE POOL TO THE SECOND │
│ TIER OF THE POOL TO DISTRIBUTE STORAGE OF THE FIRST AND │
│ SECOND EXTENTS OF THE PARTICULAR LUN SLICE ACROSS │
│ MULTIPLE TIERS OF THE POOL IN ACCORDANCE WITH THE │
│ HISTORY OF EXTENT ACTIVITY (E.G., EVACUATING LUN SLICES │
│ TO LOWER TIERS AS NEEDED)                        │
└─────────────────────────────────────────────────┘  ~ 202
```

| LOGICAL EXTENT ID (E.G., LBA) 150 | TIME STAMP OF LAST ACCESS 152 | TIMES ACCESSED SINCE LAST RELOCATE EVENT 154 | ACCESS LEVEL 156 | OTHER DATA 158 (E.G., FILE ID, ETC.) |
|---|---|---|---|---|
| LBA_Q | 15:38:42 | 4 | MODERATE | ... |
| LBA_Z | 17:42:45 | 24 | HOT | ... |
| LBA_G | 08:23:01 | 3 | MODERATE | ... |
| LBA_H | 11:39:24 | 3 | MODERATE | ... |
| LBA_I | 15:39:32 | 3 | MODERATE | ... |
| LBA_P | 01:40:01 | 21 | HOT | ... |
| LBA_C | 15:40:23 | 4 | MODERATE | ... |
| LBA_U | 10:06:02 | 19 | HOT | ... |
| ... | ... | ... | ... | ... |

| | LOCK TYPE 250 | LU ID/FILE ID 252 | TIME STAMP 254 | RANGE FIELDS 256 | |
|---|---|---|---|---|---|
| | | | | STARTING OFFSET 258 | RANGE LENGTH 260 |
| 240(1) | READ | 1015 | 15:38:42 | 8 | 128 |
| 240(2) | WRITE | 1017 | 15:38:45 | 26 | 27 |
| 240(3) | READ | 1002 | 15:39:01 | 238 | 113 |
| 240(4) | READ | 1002 | 15:39:02 | 215 | 88 |
| 240(5) | WRITE | 1017 | 15:42:32 | 28 | 10 |
| 240(6) | WRITE | 998 | 15:44:01 | 30 | 16 |
| 240(7) | READ | 998 | 16:08:23 | 32 | 45 |
| 240(8) | READ | 1028 | 18:21:32 | 18 | 26 |
| | . . . | . . . | . . . | . . . | . . . |

TECHNIQUES FOR MANAGING PLACEMENT OF EXTENTS BASED ON A HISTORY OF ACTIVE EXTENTS

BACKGROUND

In general, data storage systems perform host IO (input/output) operations on behalf host devices. Along these lines, such data storage systems typically store host data within logical units (LUNs).

Some data storage systems include storage tiers which provide different data access speeds. Such a data storage system may then manage data placement among the storage tiers.

For example, suppose that a data storage system includes a tier of flash storage devices, followed by a lower tier of SAS (Serial-Attached Small Computer System Interface) devices, follow by yet a lower tier of near-line SAS devices. One conventional approach to placing host data among the storage tiers involves counting the number of host IO operations that are made to each LUN slice, i.e., 1 Gigabyte (GB) LUN sections, and migrating the LUN slices among the storage tiers based on the counted number of host IO operations for each LUN slice. That is, the data storage system counts the number of host IO operations performed on each LUN slice during a set period of time, such as a day, to determine which LUN slices are the most frequently accessed. The data storage system then moves the LUN slices which are accessed most often to the highest tier while pushing other less frequently accessed LUN slices down to the lower tiers as needed.

SUMMARY

Unfortunately, there are deficiencies to the above-described conventional approach to moving LUN slices (i.e., 1 GB LUN sections) among storage tiers based on the counted number of host IO operations for each LUN slice. For example, due to the coarse 1 GB granularity of a LUN slice, the conventional approach cannot distinguish between (i) one LUN slice which is accessed in an evenly distributed manner and (ii) another LUN slice having a few data blocks which are very active and large areas which are very inactive. Rather, both LUN slices would be treated in the same manner by the conventional approach even though it might be preferable to promote one of the LUN slices to a higher storage tier.

One might consider simply changing the level of granularity from a LUN slice to a data block (e.g., 8 KB, 4 KB, 512 bytes, etc.). Unfortunately, individually counting host IO operations at the data block level would be extremely costly in terms of overhead. That is, the processing time and the amount of memory required to track the number of host IO operations to each data block makes this alternative prohibitively expensive. Additionally, this may cause fragmentation since each data block would be counted individually without considering spatial locality of reference.

In contrast the above-described conventional approach to moving LUN slices among storage tiers based on the counted number of host IO operations for each LUN slice, an improved technique involves managing data placement of extents based on a history of extent activity. Such a history is capable of being gathered by and then obtained from a lock history database which records IO hot spots based on ranges of extents which are locked by host IO operations. In accordance with the improved technique a first extent of a particular LUN slice may be stored on a first tier of storage (e.g., slow storage devices) and a second extent of the particular LUN slice may be stored on a second tier of storage (e.g., fast storage devices) thus providing data placement at the sub-slice level. Moreover, the improved technique may involve finding free space on a partially consumed slice of memory in the second tier, and relocating the second extent to a free area of that partially consumed slice in the second tier in order to optimize space utilization.

One embodiment is directed to a method of managing placement of extents which is performed in a data storage apparatus having (i) processing circuitry and (ii) a pool of non-volatile storage which stores the extents. The method includes constructing, by the processing circuitry, an active extent list which identifies active extents stored in the pool based on a history of extent activity. The method further includes based on the active extent list, generating a set of preferred extent-tier pairings for extents of a particular logical unit (LUN) slice that are initially stored on a first tier of the pool, the set of preferred extent-tier pairings matching (i) a first extent of the particular LUN slice to the first tier of the pool and (ii) a second extent of the particular LUN slice to a second tier of the pool. The method further includes, based on the set of preferred extent-tier pairings, maintaining storage of the first extent of the particular LUN slice on the first tier of the pool and relocating storage of the second extent of the particular LUN slice from the first tier of the pool to the second tier of the pool to distribute storage of the first and second extents of the particular LUN slice across multiple tiers of the pool in accordance with the history of extent activity.

In some arrangements, the second tier includes a LUN-slice-sized memory area having a filled portion which currently stores host data and an empty portion which is currently free to store host data. In these arrangements, relocating storage of the second extent from the first tier to the second tier includes repositioning the second extent from the first tier to the empty portion of the LUN-slice-sized memory area of the second tier. Such operation enables host data of multiple LUN slices to occupy a single LUN-slice-sized area of memory In some arrangements, the active extent list includes a ranking of extents according to the history of extent activity. In these arrangements, generating the set of preferred extent-tier pairings includes, based on the ranking of extents of the active extent list, selecting (i) certain extents to move from the first tier to the second tier and (ii) other extents to continue to store in the first tier. Here, the second extent of the particular LUN slice is among the certain extents selected to be moved from the first tier to the second tier.

In some arrangements, selecting certain extents to move from the first tier to the second tier and other extents to continue to store in the first tier includes, prior to copying the second extent from the first tier to the empty portion of the LUN-slice-sized memory area of the second tier, identifying LUN-slice-sized memory areas of the second tier which have empty portions which are currently free to store host data. That is, the data storage apparatus is routinely able to find LUN-slice-sized areas of memory having free space to store additional host data extents.

In some arrangements, the method further includes, prior to copying the second extent from the first tier to the empty portion of the LUN-slice-sized memory area of the second tier, evacuating LUN slices of host data from the second tier to the first tier to increase available storage space in the second tier. In these arrangements, the data storage apparatus may evacuate cold LUN slices (i.e., LUN slices which are relatively inactive) from the second tier to the first tier.

Other embodiments are directed to systems, apparatus, processing circuits, computer program products, and so on. Some embodiments are directed to various methods, devices, electronic components and circuitry which are involved in managing data placement of extents based on a history of extent activity.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Overview

Improved techniques involve managing data placement of extents based on extent activity history. Such a history is capable of being gathered by and then obtained from a lock history database which records IO hot spots (i.e., active extents) based on ranges of extents which are locked by host IO operations. In accordance with the improved techniques a first extent of a particular LUN slice may be stored on a first tier of storage (e.g., slow storage devices) and a second extent of the particular LUN slice may be stored on a second tier of storage (e.g., fast storage devices) thus providing data placement granularity at the sub-slice level. Moreover, the improved technique may involve finding free space on a partially consumed slice of memory in the second tier, and relocating the second extent to a free area of that partially consumed slice in the second tier in order to optimize space utilization.

Figure 1:
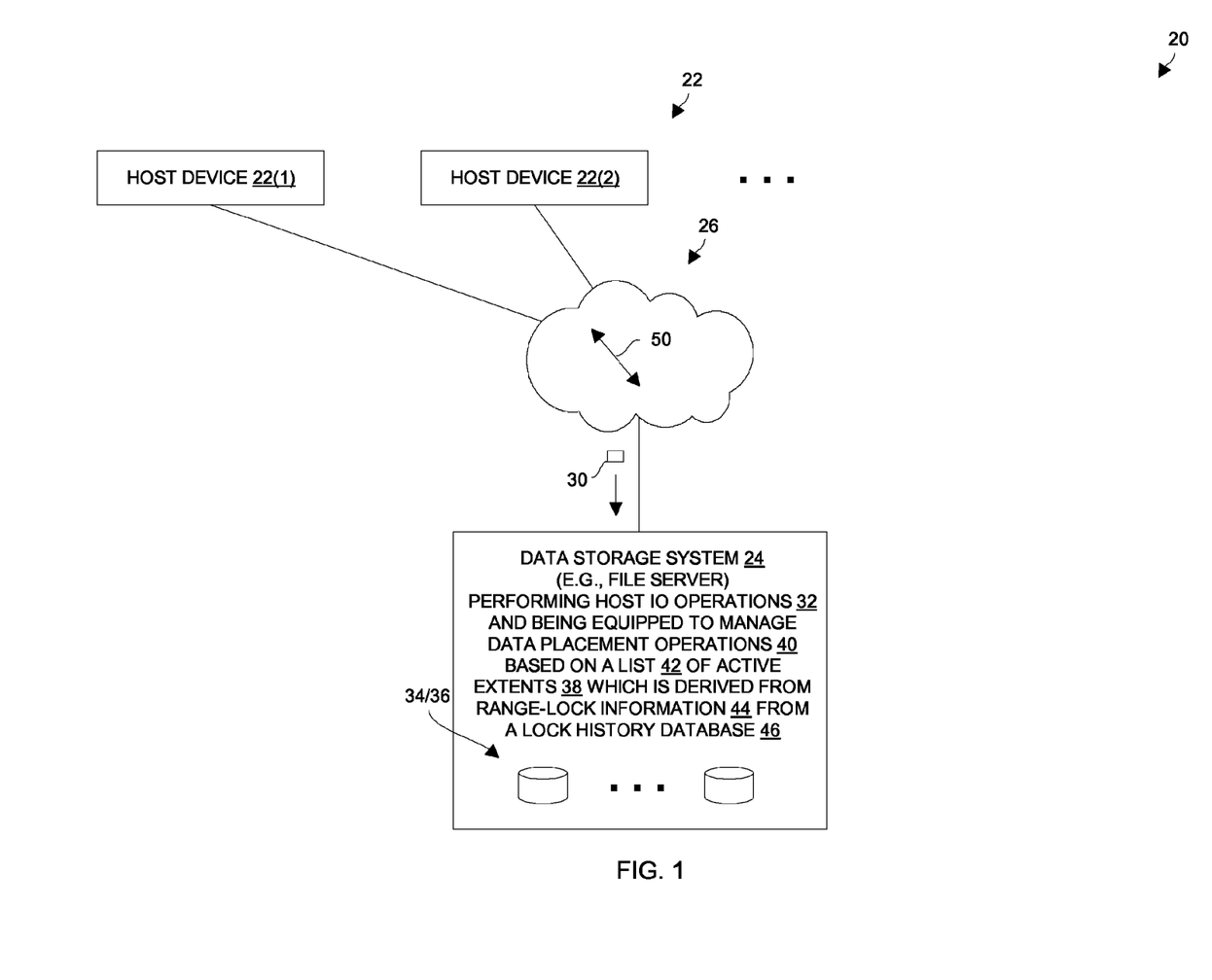
FIG. 1 is a block diagram of an electronic environment which includes a data storage apparatus equipped to manage placement of extents based on a history of active extents.

FIG. 1 shows a data storage environment 20 which is equipped with data placement management based on a history of active extents (e.g., frequently accessed blocks of host data). The data storage environment 20 includes host devices 22(1), 22(2), ... (collectively, host devices 22), a data storage system 24, and a communications medium 26.

The host devices 22 are constructed and arranged to store host data into and load host data from the data storage system 24. Along these lines, each host device 22 provides host IOs 30 (e.g., read commands to read host data, write commands to write host data, etc.) to the data storage system 24 for processing.

The data storage system 24 is constructed and arranged to process the host IOs 30 from the host devices 22 by performing host TO operations 32 (e.g., read IOs, write IOs, etc. in response to the host IOs 30) on a set of LUNs 34. Each LUN 34 is partitioned into 1 GB slices 36, and each 1 GB slice 36 is partitioned into extents 38 (e.g., 8 KB data blocks). Such extents 38 are addressable (e.g., via logical block addressing or LBAs) and are mappable (e.g., to file system block numbers or FSBNs).

Additionally, the data storage system 24 is constructed and arranged to manage data placement operations 40 based on a list 42 of active extents 38. Such data placement operations 40 include, among others things, polling for extent activity information, ranking extents 38 based on activity (e.g., hot or cold temperature), generating preferred extent-tier pairings for the extents 38, finding potential partially consumed slice locations among tiers of storage, relocating extents 38 among the storage tiers, and evacuating extents 38 from higher storage tiers to lower storage tiers. As will be explained in further detail below, the data storage system 24 is able to construct the active extent list 42 from range-lock information 44 stored in a lock history database 46 and manage the data placement operations 40 based on such range-lock information 44.

The communications medium 26 connects the various components of the data storage environment 20 together to enable these components to exchange electronic signals 50 (e.g., see the double arrow 50). At least a portion of the communications medium 26 is illustrated as a cloud to indicate that the communications medium 26 is capable of having a variety of different topologies including backbone, hub-and-spoke, loop, irregular, combinations thereof, and so on. Along these lines, the communications medium 26 may include copper-based data communications devices and cabling, fiber optic devices and cabling, wireless devices, combinations thereof, etc. Furthermore, the communications medium 26 is capable of supporting LAN-based communications, SAN-based communications, or combinations thereof.

During operation, the data storage system 24 receives host IOs 30 from the host devices 22. In order to maintain data consistency, the data storage system 24 imposes locks on the extents 38 when processing the host IOs 30. For example, the data storage system 24 applies read (or shared) locks on ranges of extents 38 when the host devices 22 read host data from these ranges of extents 38. Furthermore, the data storage system 24 applies write (or exclusive) locks on ranges of extents 38 when the host devices 22 write host data to these ranges of extents 38.

As the data storage system 24 imposes range locks on the ranges of extents 38, the data storage system 24 updates the range-lock information 44 in the lock history database 46 based on these range locks. Accordingly, the data storage system 24 is then able to discern which extents 38 are more active than others based on the range-lock information 44. In particular, the data storage system 24 constructs a list 42 of active extents 38, and then efficiently manages data placement operations 40 based on the list 42. For example, based on the list 42, the data storage system 24 relocates more active extents 38 to higher storage tiers (i.e., faster storage). Additionally, based on the list 42, the data storage system 24 evacuates less active extents 38 to lower storage tiers (i.e., slower storage) as needed. Further details will now be provided with reference to FIG. 2.

Figure 2:
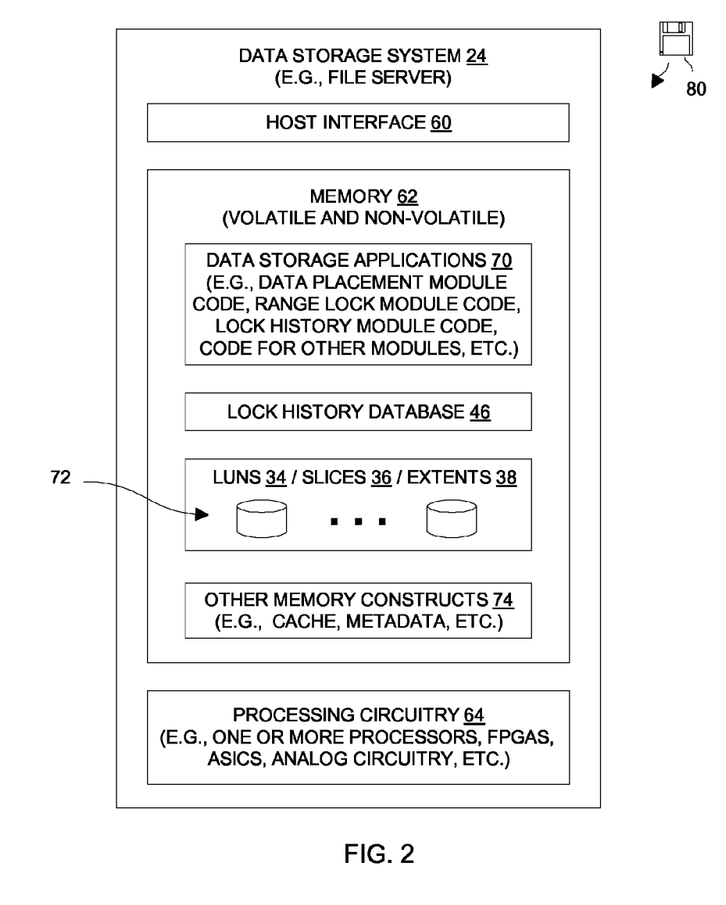
FIG. 2 is a block diagram of the data storage apparatus of FIG. 1.

FIG. 2 shows particular details of the data storage system 24 of the data storage environment 20 (also see FIG. 1). As shown in FIG. 2, the data storage system 24 includes a host interface 60, memory 62, and processing circuitry 64 among other things. The memory 62 includes a set of data storage applications 70, the lock history database 46, a pool of tiered non-volatile storage 72 for the above-mentioned LUNs 34, slices 36 and extents 38, as well as other memory constructs 74.

The host interface 60 is constructed and arranged to connect the data storage system 24 to the communications medium 26. Accordingly, the host interface 60 enables the data storage system 24 to communicate with the other components of the data storage environment 20 such as the host devices 22 (FIG. 1).

The memory 62 is intended to represent both volatile memory (e.g., DRAM, SRAM, etc.) and non-volatile memory (e.g., flash storage units, magnetic disk drives, etc.). The data storage applications 70 represent the operating system, drivers, utilities and tools, user-level applications, GUIs, and so on. The pool of tiered non-volatile storage 72 represents persistent memory which contains the host data. The other memory constructs 74 include additional memory-based items such as a buffer cache to temporarily cache copies of host data accessed by the host devices 22, metadata for locks, metadata for the data placement operations 40 (e.g., the active extent list 42, the preferred extent-tier pairings for the extents 38, etc.), and so on.

In some arrangements, the pool of tiered non-volatile storage 72 is tiered into several levels based on access speed. For example, the pool of tiered non-volatile storage 72 may include a first tier of flash memory, a second tier of SAS memory, and a third tier of near line SAS memory. In these arrangements, the buffer cache of the data storage system 24 (also see the other memory 74 in FIG. 2) is constructed and arranged to temporarily cache, on behalf of the host devices 22, copies of the extents 38 which are persistently stored (and synchronized) in the respective storage tiers of the pool of tiered non-volatile storage 72.

The processing circuitry 64 is constructed and arranged to perform load and store operations (i.e., to process host IOs 30) on behalf of the host devices 22 (FIG. 1). Additionally, the processing circuitry 64 is constructed and arranged to control updating of the lock history database 46, generate a list 42 of active extents 38 based on the lock history database 46, and manage data placement operations 40 based on the list 42 (also see FIG. 1).

It should be understood that the processing circuitry 64 can be implemented in a variety of ways including via one or more processors running specialized software, application specific ICs (ASICs), field programmable gate arrays (FPGAs) and associated programs, discrete components, analog circuits, other hardware circuitry, combinations thereof, and so on. In the context of one or more processors running specialized software, a computer program product 80 is capable of delivering all or portions of the software to the data storage system 24. The computer program product 80 has a non-transitory (or non-volatile) computer readable medium which stores a set of instructions which controls one or more operations of the data storage system 24. Examples of suitable computer readable storage media include tangible articles of manufacture and apparatus which store instructions in a non-volatile manner such as CD-ROM, flash memory, disk memory, tape memory, and the like.

During operation, the data storage system 24 performs host IO operations 32 in response to the host IOs 30 received from the host devices 22 (FIG. 1). As the data storage system 24 imposes locks on ranges of extents 38 prior to accessing the ranges of extents 38, the data storage system 24 updates range-lock information 44 in the lock history database 46 based on the ranges of extents 38 which were locked by the host IO operations 32.

With the range-lock information 44 of the lock history database 46 now available for analysis, the contents of the lock history database 46 are able to identify particular extents 38 which are active and inactive. As a result, the data storage system 24 is able to effectively manage the data placement process based on levels of activity recorded at the sub-slice level, i.e., based on extent activity. Further details will now be provided with reference to FIG. 3.

Figure 3:
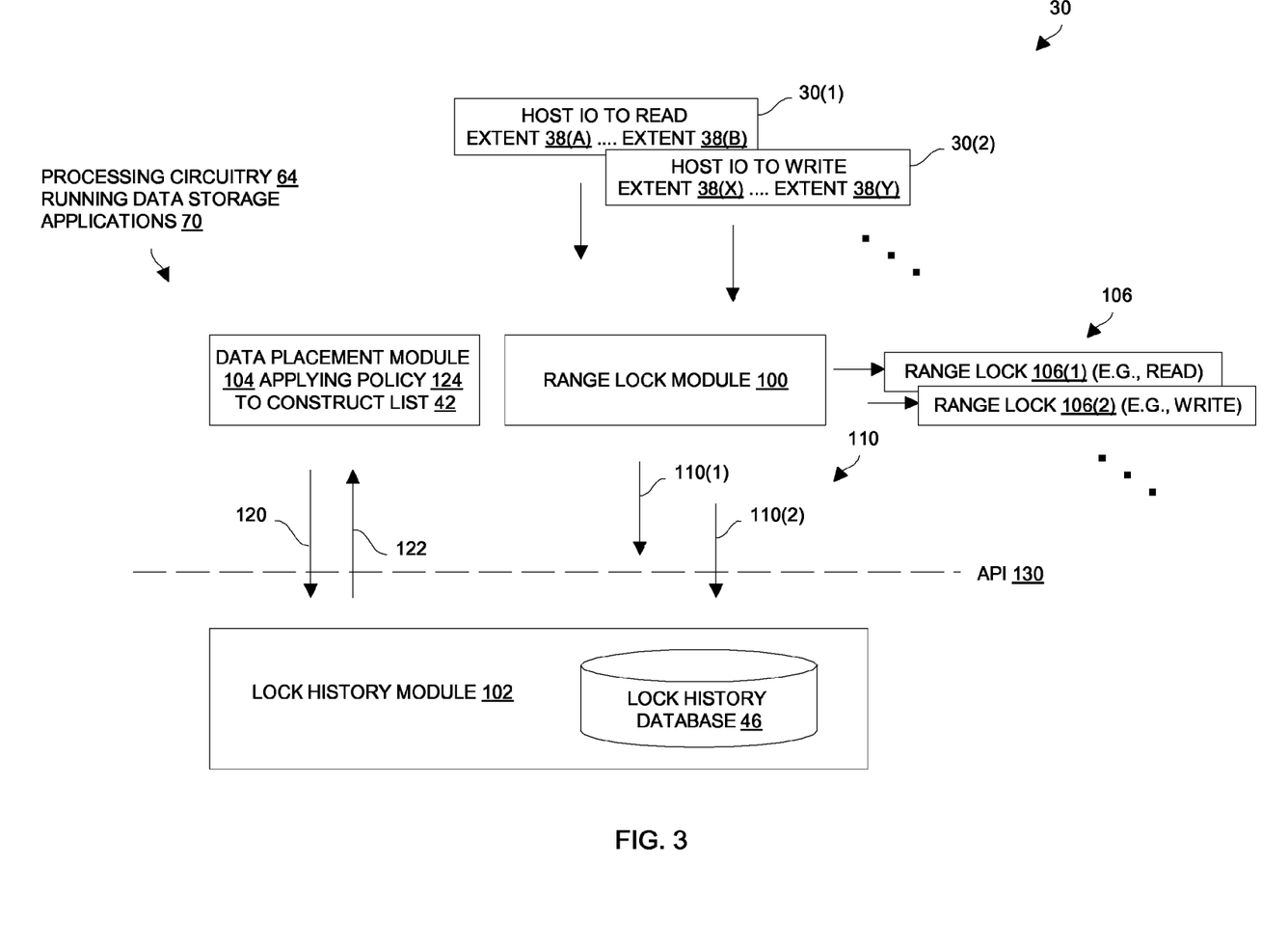
FIG. 3 is a block diagram of particular details of the data storage apparatus of FIG. 2.

FIG. 3 shows particular components of the data storage system 24 which are formed by the processing circuitry 64 when the processing circuitry 64 operates in accordance with the data storage applications 70 (also see FIG. 2). In particular, when the processing circuitry 64 executes code for a range lock module, the processing circuitry 64 forms a range lock module 100. Additionally, when the processing circuitry 64 executes code for a lock history module, the processing circuitry 64 forms a lock history module 102. Furthermore, when the processing circuitry 64 executes code for a data placement module, the processing circuitry 64 forms a data placement module 104. Likewise, the processing circuitry 64 is capable of executing other service module code (see applications 70 in FIG. 2), to form other service modules as well.

The range lock module 100 is constructed and arranged to impose range locks 106 on ranges of extents 38 as the data storage system 24 performs the host IO operations 32, and thus preserve data coherency and consistency. By way of example, the range lock module 100 is shown as responding to a host IO 30(1) to read host data from extents 38(A), . . . , 38(B) by providing, as part of that host IO operation 32, a read lock 106(1) (i.e., a shared lock) on extents 38(A), . . . , 38(B). Additionally, the range lock module 100 is shown as responding to another host IO 30(2) to write host data to extents 38(X), . . . , 38(Y) by providing, as part of that host IO operation 32, a write lock 106(2) (i.e., an exclusive lock) on extents 38(X), . . . , 38(Y).

The lock history module 102 is constructed and arranged to manage the lock history database 46 holding the range-lock information 44 (also see FIG. 1). In particular, the lock history module 102 receives IO event messages 110 from the range lock module 100 which informs the lock history module 102 of the range locks 106 imposed by the range lock module 100. For example, when the range lock module 100 imposes the read lock 106(1) on extents 38(A), . . . , 38(B), the range lock module 100 provides an IO event message 110(1) informing the range lock module 100 that a read lock 106(1) was imposed on the range of extents 38(A), . . . , 38(B), and the lock history module 102 responds by adding an appropriate entry into the lock history database 46. Likewise, when the range lock module 100 imposes the write lock 106(2) on extents 38(X), . . . , 38(Y), the range lock module 100 provides an IO event message 110(2) informing the range lock module 100 that a write lock 106(2) was imposed on the range of extents 38(X), . . . , 38(Y), and the lock history module 102 responds by adding another appropriate entry into the lock history database 46.

As further shown by FIG. 3, the data placement module 104 is able to communicate with the lock history module 102. In particular, the data placement module 104 sends a request signal 120 to the lock history module 102 to obtain the contents of the lock history database 46. In response to the request signal 120, the lock history module 102 provides a response signal 122 containing the contents of the lock history database 46 thus enabling the data placement module 104 to poll the contents and operate based on the contents.

Once the range-lock information 44 is obtained by the data placement module 104, the data placement module 104, is able to construct the list 42 of active extents 38. In some arrangements, the data placement module 104 applies a policy 124 to compute a temperature for each extent that was accessed since the last extent relocation event and places that information on the list 42. For example, the policy 124 may consider any extent 38 which has not been accessed since the last extent relocation event (or within a predefined amount of time such as the last 24 hours) to be "cold" and either not include that extent 38 on the list 42 at all or indicate, on the list 42, that the extent 38 is cold. Additionally, the policy 124 may consider any extent 38 which has been accessed since the last extent relocation event (or within the predefined amount of time) but accessed less than a predefined number of times such as six times, eight times, etc. since the last extent relocation event to be "moderate" in temperature. Furthermore, the policy 124 may consider any extent 38 which has been accessed over the predefined number of times since the last extent relocation event (or within the predefined amount of time) to be "hot". Other policies 124 are suitable for use as well.

In some arrangements, the range lock module 100 and the data placement module 104 communicate with the lock history module 102 through an application programming interface (API) 130. That is, each module 100, 104 is able to call a predefined routine or issue a predefined instruction to the lock history module 102. Similarly, the lock history module 102 is able to call a predefined routine or issue a predefined instruction to the other modules 100, 104. Further details will now be provided with reference to FIGS. 4 through 7.

Data Placement Module

Figure 4:
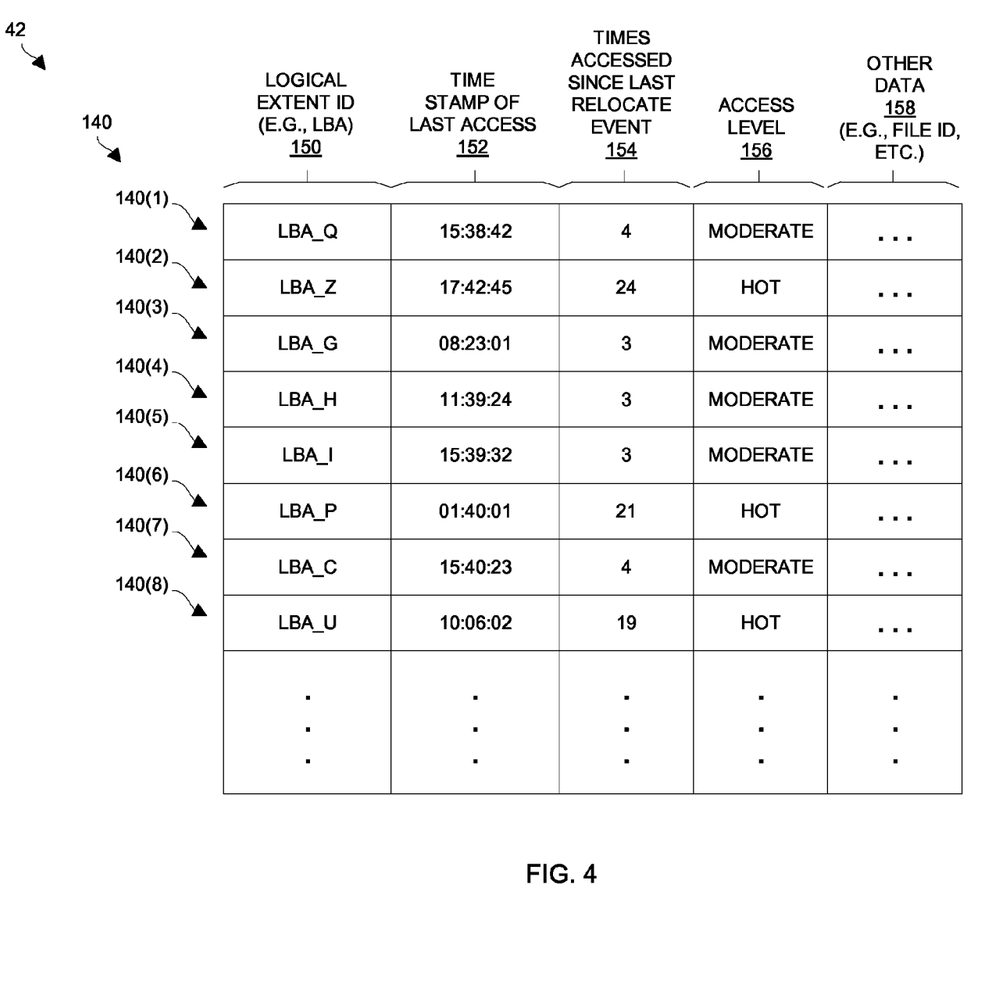
FIG. 4 is a block diagram of an active extent list which is utilized by the data storage apparatus of FIG. 2.
Figure 5:
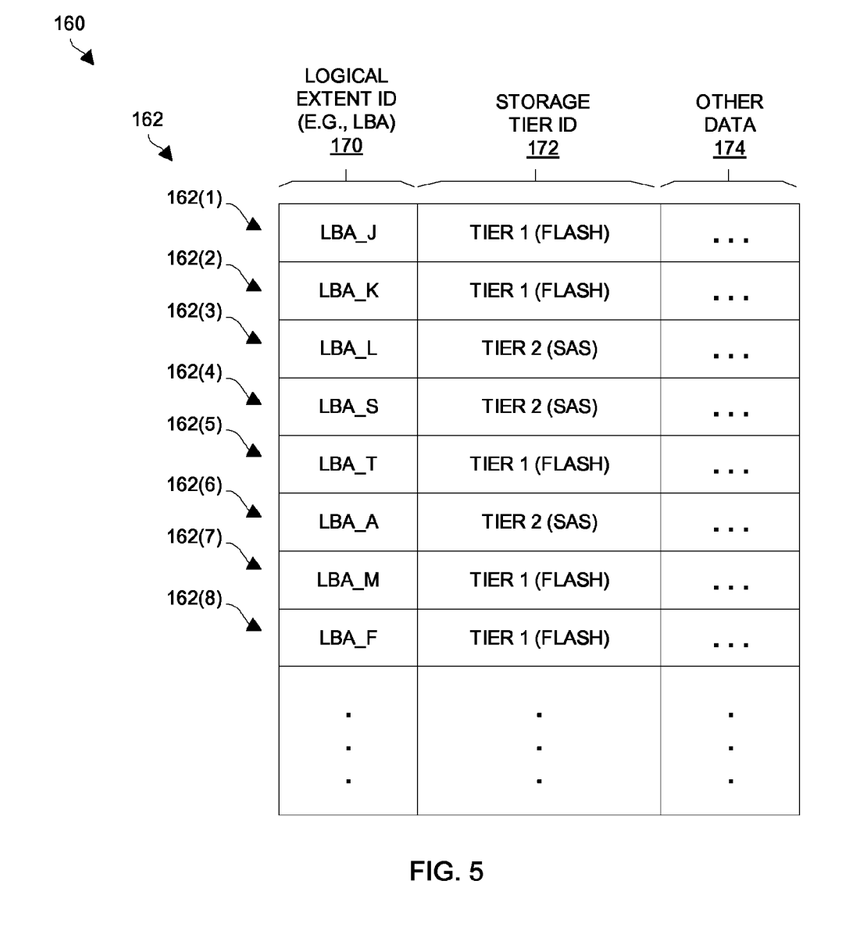
FIG. 5 is a block diagram of a set of extent-tier pairings which is utilized by the data storage apparatus of FIG. 2.
Figure 6:
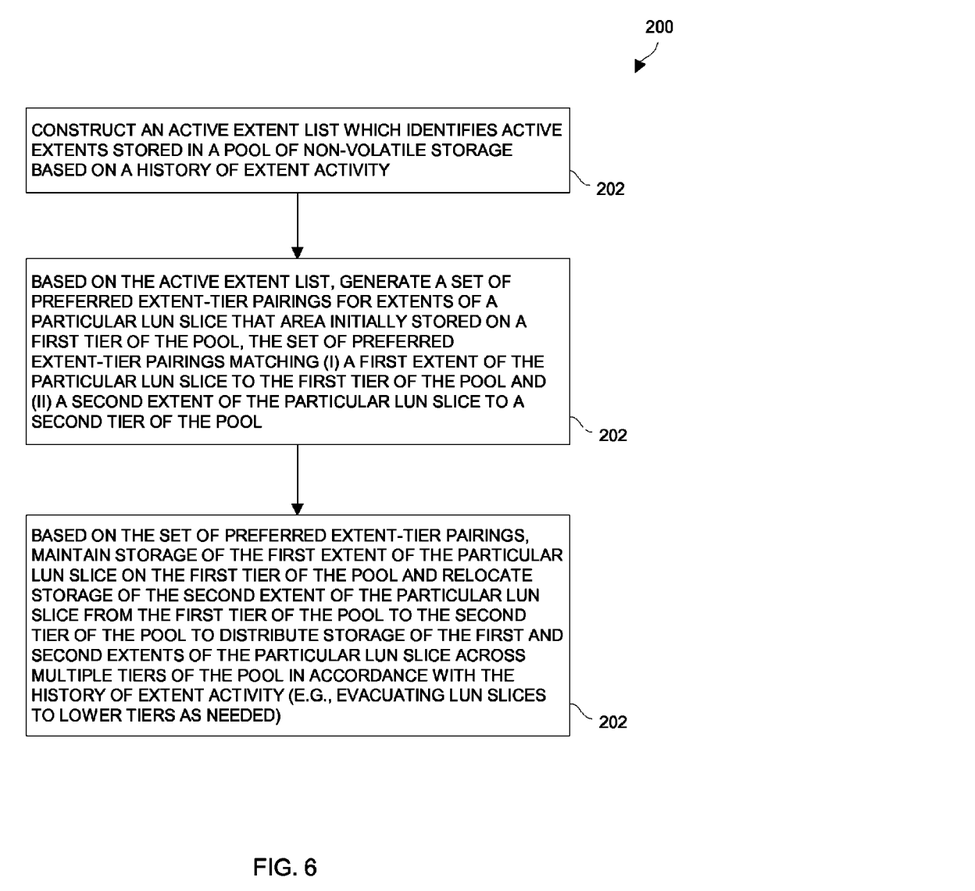
FIG. 6 is a flowchart of a data placement procedure performed by the data storage apparatus of FIG. 2.
Figure 7:
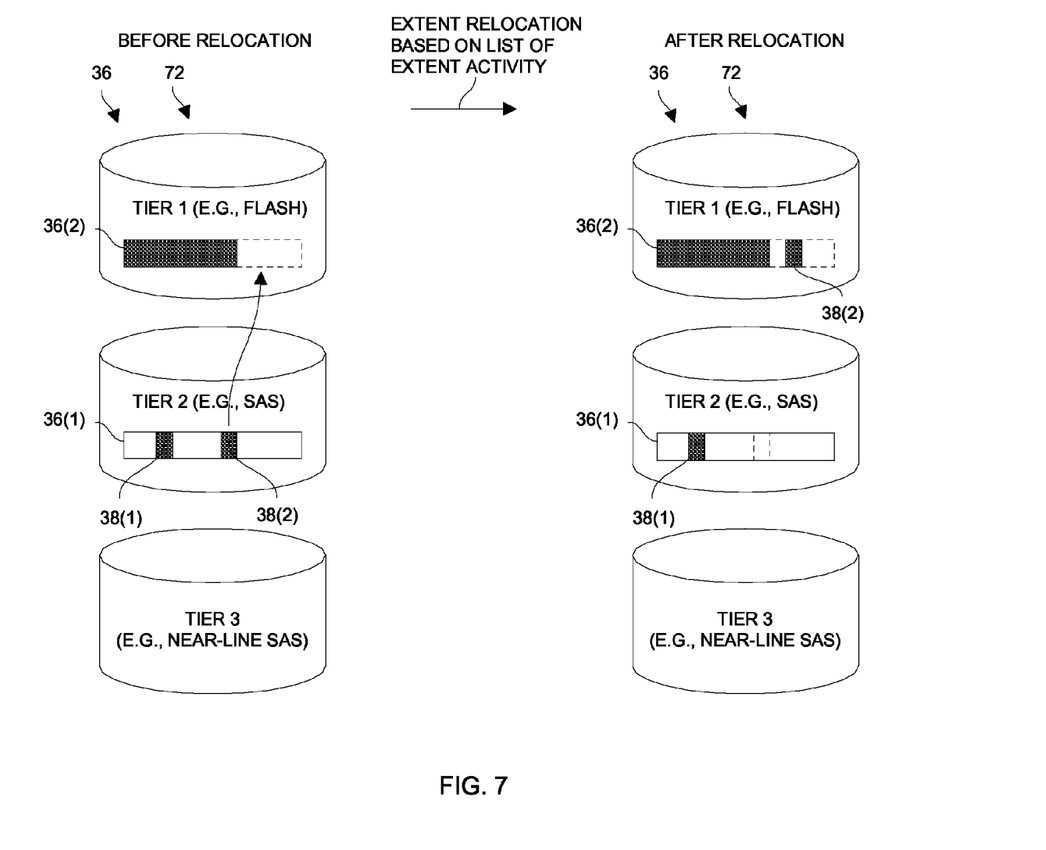
FIG. 7 is a block diagram illustrating aspects of an example data placement process.

FIGS. 4 through 7 show particular details of the data placement process. In particular, FIG. 4 shows an example list 42 of active extents 38 that is constructed by the data placement module 104 based on polling the lock history module 102 (also see FIG. 3). FIG. 5 shows an example set 160 of preferred extent-tier pairings 162 which is generated by the data placement module 104 as part of the data placement process. FIG. 6 is a flowchart of a data placement procedure 200 which is performed by the processing circuitry 64 (FIG. 2) when operating as the data placement module 104 (FIG. 3). FIG. 7 shows how data placement based on the list 42 of active extents 38 results in optimized placement of extents 38 among tiers of the pool of non-volatile storage 72.

With attention directed to FIG. 4, the list 42 of active extents 38 identifies extents 38 which recently received range-locks as imposed by the range lock module 100, and tracked by the lock history module 102. Such a list 42 is capable of being constructed by filtering and tabulating the range-lock information 44 obtained from the lock history module 102 (FIG. 2).

By way of example, list 42 includes entries 140 which correspond to respective extents 38. Each entry 140 includes a logical extent identifier field 150, a time stamp field 152, an access count field 154, an access level field 156, and other fields 158. The logical extent identifier field 150 is constructed and arranged to hold the logical extent identifier of a particular extent 38 (e.g., a logical block address). The time stamp field 152 is constructed and arranged to hold the time stamp of the most recent write to the particular extent 38. The access count field 154 is constructed and arranged to hold the number of times the particular extent 38 has been accessed (i.e., read or written) since the last time the data placement module 104 constructed the list 42 (or within a predefined amount of time). The access level field 156 is constructed and arranged to hold a classification (e.g., temperature) of the particular extent 38 based on access activity (e.g., hot, moderate, etc.). The other fields 156 are constructed and arranged to hold additional data such as the file identifier (or owner) of the particular extent 38, the physical location of the particular extent 38, etc.

In some arrangements, the list 24 includes cold extents 38 as well. In some arrangements, the number of different classes in the list 24 is different than three (e.g., two classes, four classes, etc.). In some arrangements, extents 38 are ranked or ordered based on the amount of access activity. Other list arrangements are suitable for use as well.

As mentioned earlier, the criteria for classifying each entry 140 in the list 42 is capable of being set by a policy 124. Over time, a user of the data storage system 24 is able to make adjustments (e.g., tune) to the operation of the data placement module 104 by changing the policy 124 (e.g., modifying policy settings, adding enhancements to the policy, etc.).

With attention directed to FIG. 5, the set 160 of preferred extent-tier pairings 162 which is generated by the data placement module 104 as part of the data placement process. By way of example, each preferred extent-tier pairing 162 includes a logical extent identifier field 170, a storage tier identifier field 172, and other data fields 174.

The logical extent identifier field 170 is constructed and arranged to hold a logical identifier of a particular extent 38 (e.g., a logical block address). The storage tier identifier field 172 is constructed and arranged to hold a storage tier identifier of a particular storage tier of the pool of non-volatile storage 72 (also see FIG. 2). The other data fields 174 are constructed and arranged to hold other data such as a file or LUN identifier to which the extent 38 belongs, and so on.

With attention directed to FIG. 6, the data placement module 104 (also see FIG. 2) performs a procedure 200 of evaluating extents 38 of a particular 1 GB LUN slice of host data for possible relocation. In particular, rather than simply relocate (or maintain) the entire 1 GB LUN slice, the data placement module 104 is able to relocate individual extents 38 and thus optimize data placement with improved precision. In some arrangements, such operation occurs during a scheduled relocation time window (i.e., during a detected extended period of inactivity, nightly, etc.).

In step 202, the data placement module 104 constructs an active extent list 42 which identifies active extents 38 stored in the pool of non-volatile storage 72 based on a history of extent activity. In particular, the data placement module 104 periodically polls the lock history module 102 for such information (e.g., every five minutes, every hour, etc.).

In step 204, the data placement module 104 generates, based on the active extent list 42, a set 160 of preferred extent-tier pairings 162 for extents 38 of the particular LUN slice that are initially stored on a first tier of the pool of non-volatile storage 72. In particular, the set 160 of preferred extent-tier pairings 162 matches (i) a first extent of the particular LUN slice to the first tier of the pool of non-volatile storage 72 and (ii) a second extent of the particular LUN slice to a second tier of the pool of non-volatile storage 72.

In step 206, the data placement module 104, based on the set 160 of preferred extent-tier pairings 162, maintains storage of the first extent of the particular LUN slice on the first tier of the pool of non-volatile storage 72 and relocates storage of the second extent of the particular LUN slice from the first tier of the pool of non-volatile storage 72 to the second tier of the pool of non-volatile storage 72. Accordingly, the data placement module 104 is able to distribute storage of the first and second extents of the particular LUN slice across multiple tiers of the pool of non-volatile storage 72 in accordance with the history of extent activity.

FIG. 7 shows how data placement based on the list 42 of active extents 38 results in optimized placement of extents 38 among tiers of the pool of non-volatile storage 72 with sub-slice granularity. By way of example only, the pool of non-volatile storage 72 has three tiers, i.e., a first tier of flash storage (fastest), a second tier of SAS storage (moderate speed), and third tier of near line SAS (slowest).

The left side of FIG. 7 shows initial positions of two extents 38(1), 38(2) which occupy a particular LUN slice 36(1). As further shown on the left side of FIG. 7, another LUN slice 36(2) is partially filled with host data but also include a free portion (illustrated by the dashed lines).

During relocation analysis, the data placement module 104 evaluates the extents 38(1), 38(2) and constructs the list 42 (also see FIG. 4 and step 202 in FIG. 6). Then, the data placement module 104 generates new extent-tier pairings based on the list 42 (also see FIG. 5 and step 204 in FIG. 6). Finally, based on the extent-tier pairings, the data placement module 104 moves certain extents 38 (see extent 38(2) in FIG. 7) to another tier.

By way of example and as shown on the right side of FIG. 7, the extent 38(2) is relocated to the available space of the LUN slice 36(2). Accordingly, the extent 38(2) no longer resides in the LUN slice 36(1). As a result, the LUN slice 36(1) now has available space perhaps to hold another extent 38.

It should be understood that similar relocation operations may occur from tier 3 to tier 2. Moreover, there is no requirement that relocation must occur between adjacent tiers. Rather, it is possible for an extent 38 to be relocated from tier 3 to tier 1, etc.

In some arrangements, the data placement module 104 evacuates entire LUN slices 36 from higher tiers to lower tiers as space is needed. In other arrangements, the data placement module 104 evacuates entire LUN slices 36 as soon as the data placement module 104 reclassifies the LUN slices 36 to a different storage tier and space on the storage tiers is available. Further details will now be provided with reference to FIGS. 8 through 10.

Lock History Module

Figure 8:
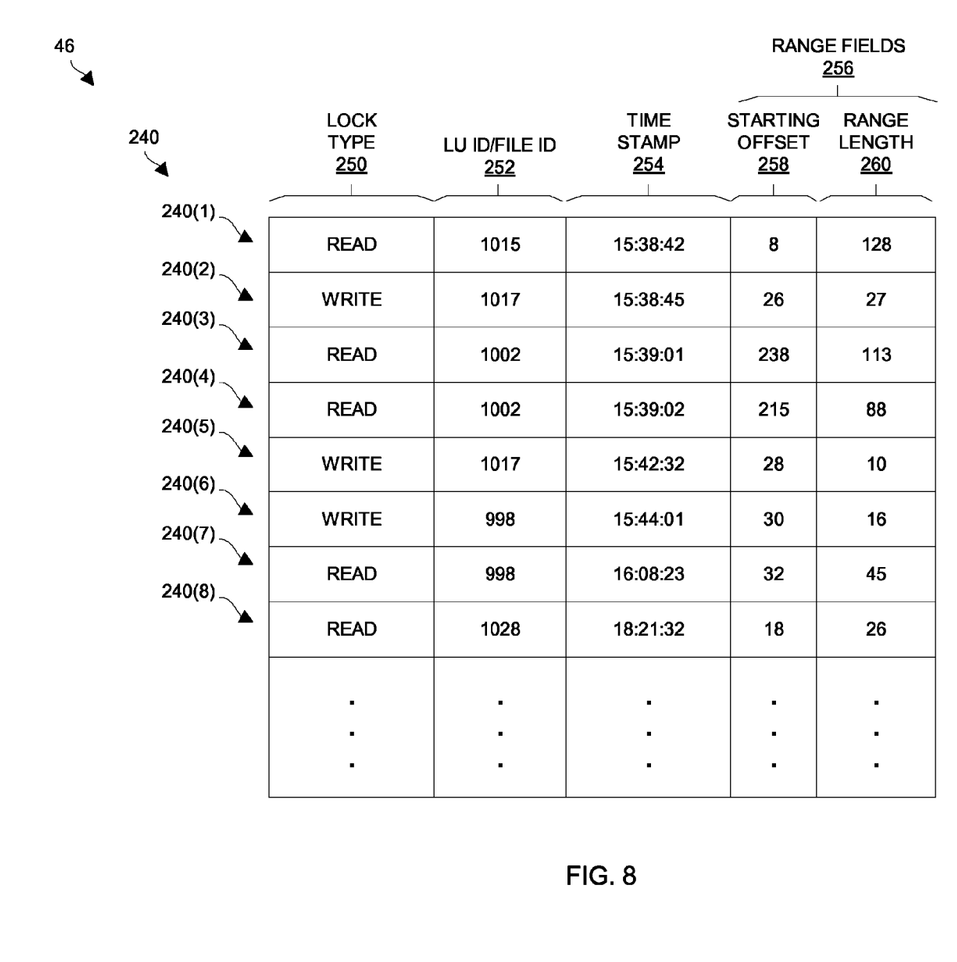
FIG. 8 is a block diagram of a portion of a lock history database which is managed by the data storage apparatus of FIG. 2.
Figure 9:
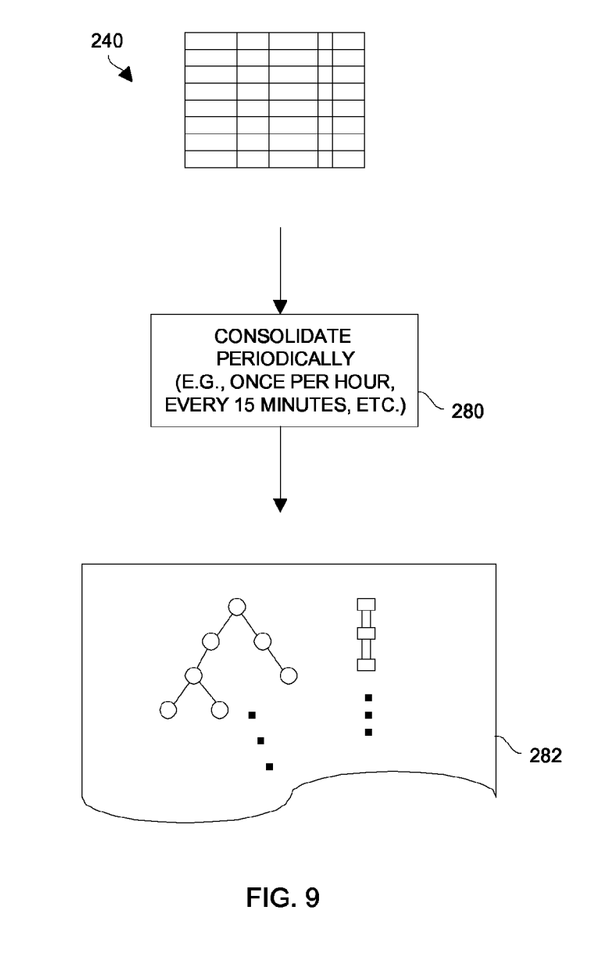
FIG. 9 is a block diagram of a consolidation process which is performed on the lock history database by the data storage apparatus of FIG. 2.
Figure 10:
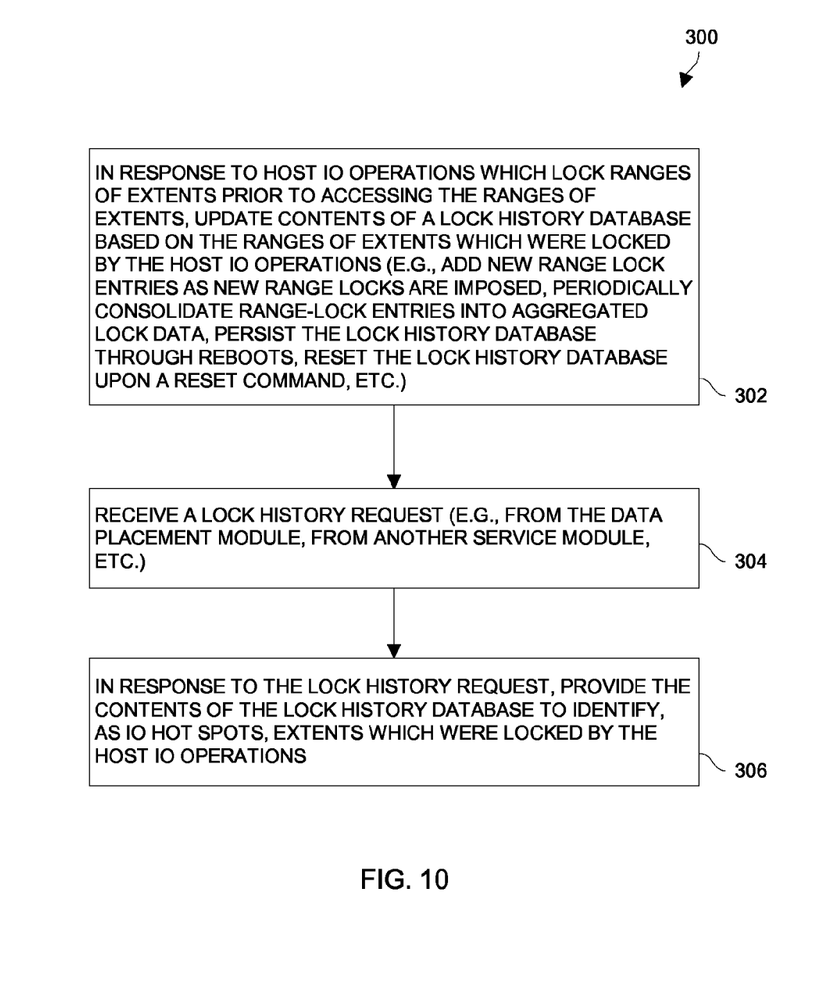
FIG. 10 is a flowchart of a procedure for managing access to the lock history database which is performed by the data storage apparatus of FIG. 2.

FIGS. 8 through 10 show particular details of the lock history module 102. In particular, FIG. 8 shows a set of range-lock entries 240 of the lock history database 46. FIG. 9 shows a consolidation operation which is periodically performed by the lock history module 102 on the set of range-lock entries 240 when managing the range-lock information of the lock history database 46. FIG. 10 shows a flowchart of a procedure 300 which is performed by the lock history module 102.

As shown in FIG. 8, the lock history database 46 includes a set of range-lock entries 240. Each time the lock history module 102 receives an event message 110 informing the lock history module 102 of a new lock 106 imposed on a range of extents 38 from the range lock module 100, the lock history module 102 adds a new range-lock entry 240 in the lock history database 46 to record that lock 106 (also see FIG. 3).

Each range-lock entry 240 includes a lock type field 250, a logical unit identifier (or file ID) field 252, a time stamp field 254, and a set of range fields 256. The fields of each range-lock entry 240 hold range-lock information corresponding to a range lock 106 imposed by the range lock module 100 during a particular host IO operation 32 thus recording the details of that range lock 106. In particular, the lock type field 250 holds a value indicating the type of lock (e.g., a read lock or a write lock) for that range lock 106. The logical unit identifier field 252 holds a logical unit identifier to identify a logical unit for that range lock 106 (i.e., a particular logical unit among multiple logical units maintained for reading and writing by the data storage system 24). The time stamp field 254 holds a time stamp indicating a particular time in which a particular host IO operation 32 locked the range of extents 38. The set of range fields 256 holds range data identifying the particular range of extents 38 which was locked by the particular host IO operation 32.

In some arrangements, the set of range fields 256 includes a starting offset field 258 and a range length field 260. The starting offset field of a range-lock entry 240 holds a starting offset of a particular range lock 106, and the range length field 260 holds the length of that particular range lock 106.

In other arrangements, the set of range fields 256 define range-locks differently. For example, in some arrangements, the set of range fields 256 simply includes a start offset field and an end offset field to hold the starting and ending offsets of a particular range lock 106.

FIG. 9 illustrates a process 280, which is performed by the lock history module 102 (FIG. 3), to consolidate the set of range-lock entries 240 of the lock history database 46 into aggregated lock data 282. Once the set of range-lock entries 240 is consolidated into the aggregated lock data 282, the set of range-lock entries 240 can be deleted from the lock history database 46 to reduce the amount of consumed memory 62. Such a process 280 is capable of being performed routinely (e.g., every hour, every 15 minutes, etc.) as well as manually (e.g., in response to a user command). As a result, the lock history database 46 includes a current set of range-lock entries 240 (i.e., range-lock entries 240 which have not yet been processed), aggregated lock data 282, or both if new range-lock entries 140 have been added since the consolidation process 280 was last performed.

Once a set of range-lock entries 240 has been processed to produce aggregated lock data 282, the aggregated lock data 282 indicates the extents 38 that had been identified by the set of range-locks 106. Accordingly, the aggregated lock data 282 identifies extents which have been recently accessed and which are thus considered active or "hot". Once the aggregated lock data 282 has been formed, future processing of a new set of range-lock entries 240 (i.e., range-lock entries 240 which have been added to the lock history database 46 since the last consolidation process 280) involves adjusting or updating the existing aggregated lock data 282 based on the new set of range-lock entries 240.

In some arrangements, when the lock history module 102 receives a request signal 120 for the contents of the lock history database 46 (FIG. 3), the lock history module 102 performs the consolidation process 280 on any existing range-lock entries 240 to update the aggregated lock data 282. The lock history module 102 then provides, as a response signal 122 (FIG. 3), only the aggregated lock data 282. For example, the response signal 122 may include a file or a pointer to a file containing just the aggregated lock data 282 or a copy of the aggregated lock data 282.

In some arrangements, the aggregated lock data 182 persists until it is cleared (e.g., in response to a user command to reset the values of the lock history database 46). In some arrangements, the lock history database 46 resides in non-volatile storage so that the lock history database 46 persists even during a reboot of the data storage system 24.

In some arrangements, the aggregated lock data 282 includes a mapping table which maps tallied access counts to each extent 38. In other arrangements, the aggregated lock data 282 includes nodes corresponding to time intervals (e.g., one hour ago, two hours ago, etc.) where each node identifies ranges of extents 38 which have been accessed within a particular time interval. Accordingly, the particular structure for the range-lock information in the aggregated lock data 282 may take a variety of forms, e.g., trees, linked lists, counters, combinations thereof, and so on.

One will appreciate that a variety of criteria may be used as a determining factor as to whether each extent 38 is active or inactive. In some arrangements, if the lock history database 46 indicates that an extent 38 was accessed within a predefined amount of time (e.g., an hour, six hours, etc.), the extent 38 is considered active. In other arrangements, if the lock history database 46 indicates that an extent 38 was accessed at least a certain predefined amount of times within a particular amount of time (e.g., at least 3 times within the last 24 hours, etc.), the extent 38 is considered active. Similarly, an extent 38 may be considered inactive if the extent 38 fails to satisfy the active criteria. Further details will now be provided with reference to FIG. 10.

FIG. 10 shows a procedure 300 which is performed by the processing circuitry 64 of the data storage system 24, while operating as the lock history module 102, to identify IO hot spots (also see FIGS. 2 and 3). In step 302, the lock history module 102 updates the contents of the lock history database 46 based on the ranges of extents 38 which were locked by host IO operations 32. In particular, as the range lock module 102 locks ranges of extents 38 as part of the host IO operations 32, the range lock module 102 issues event messages 110 to the lock history module 102 informing the lock history module 102 of the range locks 106 (FIG. 3).

In step 304, the lock history module 102 receives a lock history request. For example, the data placement module 104 (or another service module) may provide a request signal 120 to the lock history module 102 requesting the contents of the lock history database 46.

In step 306, the lock history module 102 providing the contents of the lock history database 46 to identify, as the IO hot spots, extents 38 which were locked by the host IO operations 38. In particular, the lock history module 102 outputs a response signal 122 back to the requesting data placement module 104.

Further Details

As described above, an improved technique involves managing data placement of extents 38 based on a history of extent activity. Such a history is capable of being gathered by and then obtained from a lock history database 46 which records IO hot spots based on ranges of extents 38 which are locked by host IO operations 30. In accordance with the improved technique a first extent 38(1) of a particular LUN slice 36 may be stored on a first tier of storage 72 (e.g., slow storage devices) and a second extent 38(2) of the particular LUN slice 36 may be stored on a second tier of storage 72 (e.g., fast storage devices) thus providing data placement at the sub-slice level. Moreover, the improved technique may involve finding free space on a partially consumed slice 36 of memory in the second tier, and relocating the second extent to a free area of that partially consumed slice in the second tier in order to optimize space utilization.

While various embodiments of the present disclosure have been particularly shown and described, it will be understood by those skilled in the art that various changes in form and details may be made therein without departing from the spirit and scope of the present disclosure as defined by the appended claims.

For example, it should be understood that the above-described technique for evacuating slices 36 from a higher storage tier to a lower storage tier are able to base the evacuation decisions on the range-lock information 44 of the lock history database 46 as well. Alternatively, such evacuation decisions may be based on separately collected access counts of the slices 36 themselves, based on combinations of data collected from different sources, etc.

Based on the above, one will appreciate that hard disk drives can be categorized to different storage tiers based on their performance characteristics and that, given IO workload skews commonly existing in real world applications, it may be preferable to place hot data to higher tier storage to improve overall system performance. However, prior to the improved techniques, a challenge existed in how to effectively identified hot data is moved data to optimal locations. Advantageously, the improved techniques are able to utilize range lock stats from CBFS, generating IO hot spot trend information, and thus move hot data to higher storage tiers to improve IO performance based on these stats.

In a particular implementation:
1. A policy engines (see the data placement module 104 in FIG. 3) polls range lock stats through a call back file system (CBFS) API routinely, e.g., every 5 min.
2. The policy engine identifies hot IO extents 38 based on the range lock stats and computes temperature based on the hot IO extent frequency, e.g., hot, cold, etc.
3. The policy engine then decides preferred destination storage tiers for the extents 38 based on the hot IO extent temperatures, LU tiering preferences, storage pool configuration information, and so on.
4. The policy engine then finds a list of potential destination data slice areas from the identified preferred destination tiers.
5. The policy engine then instructs the CBFS to move extents 38 to the preferred destination data slice area. In particular, if the CBFS finds free space in a destination data slice areas that can accommodate an extent 38 or range of extents 38, the policy engine moves the extent(s) 38 in a manner similar to file system reorganization (or defragmentation).
6. If the CBFS fails to find free space in a tier, the policy engine tries to free up space in the tier by finding cold LUN slices in the storage tier and evacuating host data on the cold LUN slices to a lower storage tier.

Such improved operation addresses granularity shortcomings in conventional data placement approaches. In particular, such operation is capable of greatly improving higher tier (especially flash tier) storage efficiency at low cost.

One will appreciate that the various extent activity statistics can be used for advanced techniques of data placement as well. For example, utilizing range lock stats could also help track application IO access patterns, and reduce/eliminate impact of back ground IO activity, such as backup events or online data verification.

Additionally, the data placement module 104 is capable of differentiating between different IO types such as read vs. write, random vs. sequential, small vs. big IO, and is thus able to relocate data to different storage tiers based on such differentiation. For example, such techniques may be used to place data prone to write operations on single cell flash drives and data prone to read operations on multiple cell flash drives to optimize access times. Such modifications and enhancements are intended to belong to various embodiments of the disclosure.

What is claimed is:

1. In a data storage apparatus having (i) processing circuitry and (ii) a pool of non-volatile storage which stores extents, a method of managing placement of the extents within the pool of non-volatile storage, the method comprising:

constructing, by the processing circuitry, an active extent list which identifies active extents stored in the pool of non-volatile storage based on a history of extent activity;

based on the active extent list, generating a set of preferred extent-tier pairings for extents of a particular logical unit (LUN) slice that are initially stored on a first tier of the pool of non-volatile storage, the set of preferred extent-tier pairings matching (i) a first extent of the particular LUN slice to the first tier of the pool of non-volatile storage and (ii) a second extent of the particular LUN slice to a second tier of the pool of non-volatile storage; and based on the set of preferred extent-tier pairings, maintaining storage of the first extent of the particular LUN slice on the first tier of the pool of non-volatile storage and relocating storage of the second extent of the particular LUN slice from the first tier of the pool of non-volatile storage to the second tier of the pool of non-volatile storage to distribute storage of the first and second extents of the particular LUN slice across multiple tiers of the pool of non-volatile storage in accordance with the history of extent activity.

2. The method as in claim 1 wherein the second tier of the pool of non-volatile storage includes a LUN-slice-sized memory area having a filled portion which currently stores host data and an empty portion which is currently free to store host data; and wherein relocating storage of the second extent of the particular LUN slice from the first tier to the second tier includes:

repositioning the second extent from the first tier to the empty portion of the LUN-slice-sized memory area of the second tier.

3. The method as in claim 2 wherein the active extent list includes a ranking of extents according to the history of extent activity; and wherein generating the set of preferred extent-tier pairings includes:

based on the ranking of extents of the active extent list, selecting (i) certain extents to move from the first tier to the second tier and (ii) other extents to continue to store in the first tier, the second extent of the particular LUN slice being among the certain extents selected to be moved from the first tier to the second tier.

4. The method as in claim 3 wherein selecting certain extents to move from the first tier to the second tier and other extents to continue to store in the first tier includes:

prior to copying the second extent from the first tier to the empty portion of the LUN-slice-sized memory area of the second tier, identifying LUN-slice-sized memory areas of the second tier which have empty portions which are currently free to store host data.

5. The method as in claim 4, further comprising:

prior to copying the second extent from the first tier to the empty portion of the LUN-slice-sized memory area of the second tier, evacuating LUN slices of host data from the second tier to the first tier to increase available storage space in the second tier.

6. The method as in claim 4 wherein the ranking of the active extent list indicates that the second extent was accessed more than the first extent during a recent common period of time;

wherein the pool of non-volatile storage includes (i) a faster set of storage devices having faster access speeds as the first tier, and (ii) a slower set of storage devices having slower access speeds as the second tier; and wherein generating the set of preferred extent-tier pairings applying a relocation policy to the ranking which results in selection of (i) the second tier as the preferred destination of the second extent, and (ii) the first tier as the preferred destination of the first extent.

7. The method as in claim 6 wherein repositioning the second extent from the first tier to the empty portion of the LUN-slice-sized memory area of the second tier includes:

copying the second extent from the slower set of storage devices to the faster set of storage devices, and deleting the second extent from the slower set of storage devices.

8. The method as in claim 6 wherein the data storage apparatus further has a buffer cache which is separate from the slower set of storage devices and the faster set of storage devices; and wherein the method further comprises:

after repositioning the second extent from the first tier to the empty portion of the LUN-slice-sized memory area of the second tier, temporarily caching copies of the first and second extents of the particular LUN slice in the buffer cache as the copies of the first and second extents are accessed by a set of host devices, the first extent continuing to reside in the first tier and second extent continuing to reside in the second tier while the copies of the first and second extents are temporarily cached in the buffer cache during access by the host devices.

9. The method as in claim 4 wherein repositioning the second extent from the first tier to the empty portion of the LUN-slice-sized memory area of the second tier includes:

waiting until the data storage apparatus has entered a relocation time window characterized by low host input/output activity, and after waiting until the data storage apparatus has entered the relocation time window, copying the second extent from the first tier to the empty portion of the LUN-slice-sized memory area of the second tier, and deleting the second extent from the first tier.

10. The method as in claim 4, further comprising:

prior to constructing the active extent list, obtaining the history of extent activity from a lock history database which identifies extents which were recently locked by host input/output (IO) operations.

11. A data storage apparatus, comprising:

a host interface;

a pool of non-volatile storage which stores extents; and processing circuitry coupled to the host interface and the pool of non-volatile storage, the processing circuitry (i) processing host input/output (IO) operations received through the host interface and (ii) managing data placement of the extents;

wherein the processing circuitry, when managing data placement of the extents, is constructed and arranged to:

construct an active extent list which identifies active extents stored in the pool of non-volatile storage based on a history of extent activity, based on the active extent list, generate a set of preferred extent-tier pairings for extents of a particular logical unit (LUN) slice that are initially stored on a first tier of the pool of non-volatile storage, the set of preferred extent-tier pairings matching (i) a first extent of the particular LUN slice to the first tier of the pool of non-volatile storage and (ii) a second extent of the particular LUN slice to a second tier of the pool of non-volatile storage, and based on the set of preferred extent-tier pairings, maintain storage of the first extent of the particular LUN slice on the first tier of the pool of non-volatile storage and relocate storage of the second extent of the particular LUN slice from the first tier of the pool of non-volatile storage to the second tier of the pool of non-volatile storage to distribute storage of the first and second extents of the particular LUN slice across multiple tiers of the pool of non-volatile storage in accordance with the history of extent activity.

12. The data storage apparatus as in claim 11 wherein the second tier of the pool of non-volatile storage includes a LUN-slice-sized memory area having a filled portion which currently stores host data and an empty portion which is currently free to store host data; and wherein the processing circuitry, when relocating storage of the second extent of the particular LUN slice from the first tier to the second tier, is constructed and arranged to:
   reposition the second extent from the first tier to the empty portion of the LUN-slice-sized memory area of the second tier.

13. The data storage apparatus as in claim 12 wherein the active extent list includes a ranking of extents according to the history of extent activity; and wherein the processing circuitry, when generating the set of preferred extent-tier pairings, is constructed and arranged to:
   based on the ranking of extents of the active extent list, select (i) certain extents to move from the first tier to the second tier and (ii) other extents to continue to store in the first tier, the second extent of the particular LUN slice being among the certain extents selected to be moved from the first tier to the second tier.

14. The data storage apparatus as in claim 13 wherein the processing circuitry, when selecting certain extents to move from the first tier to the second tier and other extents to continue to store in the first tier, is constructed and arranged to:
   prior to copying the second extent from the first tier to the empty portion of the LUN-slice-sized memory area of the second tier, identify LUN-slice-sized memory areas of the second tier which have empty portions which are currently free to store host data.

15. The data storage apparatus as in claim 14 wherein the processing circuitry is further constructed and arranged to:
   prior to copying the second extent from the first tier to the empty portion of the LUN-slice-sized memory area of the second tier, evacuate LUN slices of host data from the second tier to the first tier to increase available storage space in the second tier.

16. A computer program product having a non-transitory computer readable medium storing a set of instructions which, when carried out by a computerized device having access to a pool of non-volatile storage, directs the computerized device to manage placement of extents by performing a method comprising:
   constructing an active extent list which identifies active extents stored in the pool of non-volatile storage based on a history of extent activity;
   based on the active extent list, generating a set of preferred extent-tier pairings for extents of a particular logical unit (LUN) slice that are initially stored on a first tier of the pool of non-volatile storage, the set of preferred extent-tier pairings matching (i) a first extent of the particular LUN slice to the first tier of the pool of non-volatile storage and (ii) a second extent of the particular LUN slice to a second tier of the pool of non-volatile storage; and
   based on the set of preferred extent-tier pairings, maintaining storage of the first extent of the particular LUN slice on the first tier of the pool of non-volatile storage and relocating storage of the second extent of the particular LUN slice from the first tier of the pool of non-volatile storage to the second tier of the pool of non-volatile storage to distribute storage of the first and second extents of the particular LUN slice across multiple tiers of the pool of non-volatile storage in accordance with the history of extent activity.

17. The computer program product as in claim 16 wherein the second tier of the pool of non-volatile storage includes a LUN-slice-sized memory area having a filled portion which currently stores host data and an empty portion which is currently free to store host data; and wherein relocating storage of the second extent of the particular LUN slice from the first tier to the second tier includes:
   repositioning the second extent from the first tier to the empty portion of the LUN-slice-sized memory area of the second tier.

18. The computer program product as in claim 17 wherein the active extent list includes a ranking of extents according to the history of extent activity; and wherein generating the set of preferred extent-tier pairings includes:
   based on the ranking of extents of the active extent list, selecting (i) certain extents to move from the first tier to the second tier and (ii) other extents to continue to store in the first tier, the second extent of the particular LUN slice being among the certain extents selected to be moved from the first tier to the second tier.

19. The computer program product as in claim 18 wherein selecting certain extents to move from the first tier to the second tier and other extents to continue to store in the first tier includes:
   prior to copying the second extent from the first tier to the empty portion of the LUN-slice-sized memory area of the second tier, identifying LUN-slice-sized memory areas of the second tier which have empty portions which are currently free to store host data.

20. The computer program product as in claim 19, further comprising:
   prior to copying the second extent from the first tier to the empty portion of the LUN-slice-sized memory area of the second tier, evacuating LUN slices of host data from the second tier to the first tier to increase available storage space in the second tier.

* * * * *